(No Model.)
L. J. PHELPS.
PNEUMATIC TIRE.
No. 499,174. Patented June 6, 1893.
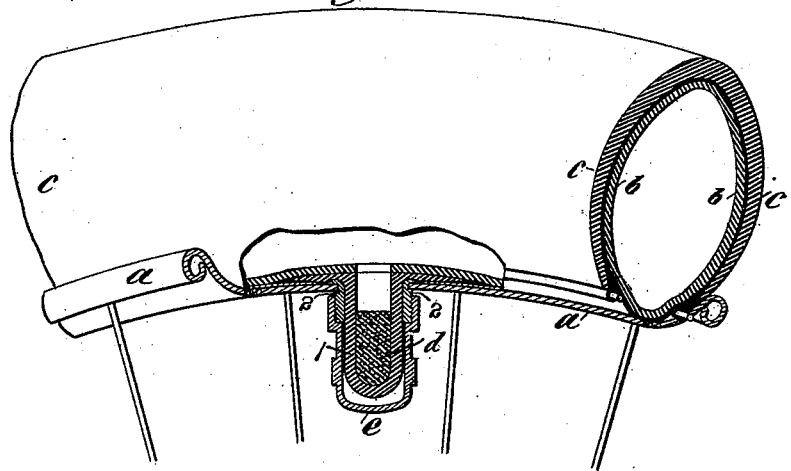
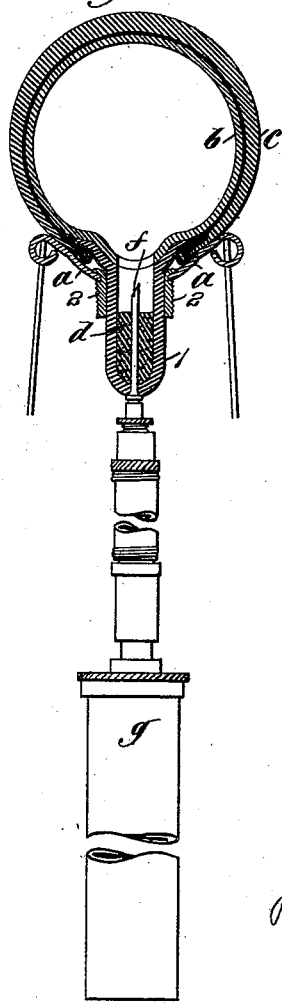
Attest:
Geo H Potts.
C. J. Sawyer
Inventor:
Lucius J. Phelps
by
Philipp Mumaw Phelps
Attys

UNITED STATES PATENT OFFICE.

LUCIUS J. PHELPS, OF PASSAIC, NEW JERSEY, ASSIGNOR TO THE PHELPS & DINGLE MANUFACTURING COMPANY, OF SAME PLACE.

PNEUMATIC TIRE.

SPECIFICATION forming part of Letters Patent No. 499,174, dated June 6, 1893.

Application filed September 21, 1892. Serial No. 446,390. (No model.)

*To all whom it may concern:*

Be it known that I, LUCIUS J. PHELPS, a citizen of the United States, residing at Passaic, county of Passaic, and State of New Jersey, have invented certain new and useful Improvements in Pneumatic Tires, fully described and represented in the following specification and the accompanying drawings, forming a part of the same.

The object of this invention is to provide an improved inflatable tube or bag, and especially to improve the construction of that part of the tube or bag by which provision is made for inflating and deinflating the same.

While the invention is of general application in all constructions employing inflatable tubes or bags for holding compressed air or other gases, the invention has been designed in connection with that class of wheel tires now in common use for bicycles and tricycles and known as pneumatic tires, and the invention consists in part of constructions embodying my invention as applied to such tires. This invention, therefore, will be illustrated and described in connection with constructions adapted especially for use in such tires.

Pneumatic tires are usually provided with a valve construction arranged for the attachment thereto of an air pump of suitable form for inflating the tire. It is necessary that this valve construction should be of such a character as to provide a secure attachment of the valve to the tire and absolutely prevent leakage under the constant strain and vibration consequent upon riding, and such constructions are complicated and unsatisfactory. Many attempts have been made to provide means for avoiding the use of valves carried by the wheel. For instance, it has been proposed to form the tire with a lining or partial lining of unvulcanized rubber or similar material adapted to automatically close a puncture so that the tire may be inflated by forcing through the wall of the tire an inflation needle of a construction similar to a hypodermic needle, and pumping in the air through this, the puncture produced by the needle being automatically closed by the self-healing layer when the needle is withdrawn. This construction is objectionable, however, for various reasons, especially because it produces punctures in the tread of the wheel which are liable to become filled with dirt, gravel, &c. The layer of self-healing material, in order to be efficient, must be of such a thickness as to reduce largely the air capacity of the tire, and when the tire is ridden deinflated, as is sometimes necessary, the self-healing layer is injured by pressure of the layer upon the opposite side of the tube. Moreover, when, as is usual, an inflation tube separate from the envelope or tread, is employed, there is nothing to hold the opposite walls of the uninflated tube apart, and unless care is exercised in forcing in the inflation needle both walls of the tube will be perforated. It has been proposed to avoid some of these objections by the use of a patch of unvulcanized rubber or similar self-healing material placed upon the inside of the tire with its position indicated upon the outside, so that the tire may be inflated and deinflated by inserting the inflation needle at this point, in the same manner as at any point with a self-healing lining. It is obvious, however, that the same objections as to the forming of punctures in the tread, and danger of puncturing both walls of the inflation tube exist in this construction and, moreover, in this case, if the tire be ridden uninflated, the patch of self-healing material is liable to be pressed out of shape and position so as not to leave a sufficient thickness of the self-healing material to accomplish its purpose. In this construction, also, it is impossible to form the patch of a sufficient thickness to secure high efficiency without extending it over a considerable portion of the tire and interfering materially with the cushioning capacity.

I avoid the use of a valve and provide a construction securing perfect protection against failure in closing the inflating puncture or leakage by accident thereto, and avoid all the objections above pointed out while employing the same principle, by the use of a nipple on the tire projecting through the rim and containing a body of unvulcanized rubber or other suitable adhesive material adapted to permit the passage of the inflating needle and to close the puncture produced thereby, either automatically or when the particles are pressed together. The nipple may be constructed in any suitable manner, but preferably consists of a nipple of elastic material, such as tough rubber or rubber compound cemented or otherwise secured to the tire or formed thereon. In compound tires, consisting of an inflation tube and separate envelope or tread, the nipple is secured to or formed on the inflation tube. The nipple may be of any form and size desired, suitable to contain a sufficient body of the adhesive material to assure the closing of the inflating puncture.

It is well-known that unvulcanized rubber and other material adapted to close small punctures is more efficient under pressure tending to force the particles together, and it will be seen that my construction provides for such increase in efficiency, as the material in the nipple is under the pressure of the air in the tire and is held from expansion by the walls of the nipple.

By the use of a nipple of elastic material I am able to insure the closing of the inflating puncture, by pressing the sides of the nipple together with the fingers, so as to force the particles of the adhesive material together, and my invention consists in part of such a construction, but it will be understood that this feature is not essential to my invention considered broadly, but a body of material of such character as to insure the closing of the puncture automatically may be used.

As above stated, the nipple may be of any desired length but I prefer to make it about an inch long, not only on account of the general convenience of such length, but also because I have found that this length is well adapted to embody another feature of my invention. As above stated, there is danger in the use of a self-healing lining or patch that both walls of the inflation tube be punctured in inserting the inflation needle. I am able to avoid all danger of this result, although the needle be inserted carelessly, by making the nipple of such length as to permit an inflating needle of the same or less length to be used, so that the end of the nipple forms a stop for the inflating needle and prevents the needle being forced in so far as to be in danger of puncturing the opposite wall of the tube.

The nipple may be made of such strong rubber as to require no protection, or may be provided with a canvas or flexible cover to strengthen it, but I prefer to protect the nipple entirely from accident by providing a removable metal cap to cover the nipple, this cap being constructed to be readily secured to and removed from the inside of the rim, preferably by forming a screw-threaded flange on the rim about the opening for the nipple and using a screw-threaded cap.

For a full understanding of my invention, a detailed description of a compound pneumatic tire construction embodying the same in the preferred form will now be given in connection with the accompanying drawings forming a part of this specification, and the features forming my invention specifically pointed out in the claims.

In the drawings—Figure 1 is a perspective view partly in section of a pneumatic tire embodying my invention. Fig. 2 is a cross section on the line 2 of Fig. 1 showing the operation of inflating.

The tire is shown as of the general construction and the envelope secured by the means shown in my Patent No. 482,487, dated September 13, 1892, except that the inflation tube is formed of a single layer and the envelope carries a strip of material forming a cushion for the tube, instead of the canvas covered inflation tube construction shown in the patent. It will be understood, however, that the general construction of the tire forms no part of the present invention, and this tire is shown only for the purpose of illustration.

Referring to said drawings—$a$ is the wheel rim on which is secured a pneumatic tire consisting of the inflation tube $b$ and the tire envelope $c$. The rim $a$ is provided with an opening and the inflation tube $b$ with a nipple $d$ extending through this opening. This nipple is shown as formed of a separate piece cemented to the inflation tube, and is preferably of tough elastic rubber, but as above stated, it will be understood that this nipple may be provided in any other suitable manner, and that the feature of elasticity providing for the compression of the adhesive material by hand may be omitted without departing from my invention, broadly considered. This nipple $d$ contains a body of adhesive material 1 adapted to close the puncture produced by the inflating needle, which material may be unvulcanized rubber or any other adhesive gum or other material suitable for this purpose. It will be understood that this nipple may be perforated at the end where the needle is to be introduced, if desired, but preferably a rubber nipple is used which may be perforated by the inflating needle. The nipple is preferably made of such length as to form a stop for the inflating needle, so that, as shown in Fig. 2, the inflating needle cannot project within the inflation tube, thus avoiding all danger of perforating the opposite wall of the tube. A metal cover is preferably provided for the inflating nipple, and this cover is provided in the construction shown by forming a screw flange 2 on the rim about the opening for the inflating nipple, and using a screw-cap $e$. The operation of inflating is shown in the drawings, Fig. 2, the inflating needle $f$ being simply forced through the inflating nipple and adhesive material therein, and the air forced in by pump $g$ in the usual manner. In deinflating it will be understood that the inflating needle is inserted without the pump and forms an outlet for the air.

It will be understood that while I have illustrated my invention only as applied to pneumatic tires, the broad features forming my invention are applicable also to other constructions, such as air pillows and beds, and especially to pneumatic saddles for cycles, the application of my improvement thereto rendering it possible for the rider to use a single pump for the saddle and tire.

While the invention has been shown as applied to a pneumatic tire of the class in which the inflation tube and outer envelope are separate, it will be understood that it is applicable also in all classes of tires employing an air cushion and inflatable, whether composed of one or more tubes.

It will be understood that I am not to be confined to the exact details of construction shown, but that modifications may be made therein by those skilled in the art without departing from my invention.

What I claim is—

1. An inflatable tube or bag having an inflating nipple containing a body of material adapted to permit the passage of an inflating needle and close the punctures produced by the same, substantially as described.

2. An inflatable tube or bag having a nipple of elastic material containing a body of material adapted to permit the passage of an inflating needle and close the punctures produced by the same, substantially as described.

3. An inflatable tube or bag having a nipple containing a body of material adapted to permit the passage of an inflating needle and close the punctures produced by the same, said nipple being of such length as to permit an inflating needle of the same or less length to be used, whereby the nipple forms a stop for the needle, substantially as described.

4. The combination with a wheel rim, of a pneumatic tire mounted on said rim and having an inflating nipple extending through said rim, and containing a body of material adapted to permit the passage of an inflating needle and close the punctures produced by the same, substantially as described.

5. The combination with a wheel rim, of a pneumatic tire mounted on said rim and having an inflating nipple of elastic material extending through said rim, and containing a body of material adapted to permit the passage of an inflating needle and close the punctures produced by the same, substantially as described.

6. The combination with a wheel rim, of an inflation tube mounted on said rim and having an inflating nipple extending through said rim, and containing a body of material adapted to permit the passage of an inflating needle and close the punctures produced by the same, and an envelope secured to the rim and forming the tread, substantially as described.

7. The combination with a wheel rim, of a pneumatic tire mounted on said rim and having an inflating nipple of elastic material extending through said rim, and containing a body of material adapted to permit the passage of an inflating needle and close the punctures produced by the same, and a cap of rigid material secured to the rim and inclosing said nipple, substantially as described.

8. The combination with rim $a$ provided with an opening, of a pneumatic tire mounted on said rim and having nipple $d$ projecting through said opening and containing a body of material 1 adapted to permit the passage of an inflating needle and close the punctures produced by the same, screw-threaded flange 2 about the opening in the rim, and screw cap $e$ inclosing said nipple, substantially as described.

In testimony whereof I have hereunto set my hand in the presence of two subscribing witnesses.

LUCIUS J. PHELPS.

Witnesses:
C. J. SAWYER,
T. F. KEHOE.